(12) United States Patent
Schweickert et al.

(10) Patent No.: US 9,909,922 B2
(45) Date of Patent: Mar. 6, 2018

(54) ANTI-ALIASING PHOTODETECTOR SYSTEM

(71) Applicant: Johnson & Johnson Vision Care, Inc., Jacksonville, FL (US)

(72) Inventors: Robert Karl Schweickert, Monument, CO (US); Steven Phillip Hoggarth, Cary, NC (US); Corey Kenneth Barrows, Colchester, VT (US); Scott Robert Humphreys, Greensboro, NC (US); Adam Walter Toner, Jacksonville, FL (US); Randall Braxton Pugh, St. Johns, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 237 days.

(21) Appl. No.: 14/844,383

(22) Filed: Sep. 3, 2015

(65) Prior Publication Data

US 2017/0068118 A1    Mar. 9, 2017

(51) Int. Cl.
| | |
|---|---|
| *G02C 11/00* | (2006.01) |
| *G01J 1/44* | (2006.01) |
| *G01J 1/42* | (2006.01) |
| *G02C 7/04* | (2006.01) |
| *H04N 5/374* | (2011.01) |
| *H04N 5/361* | (2011.01) |

(52) U.S. Cl.
CPC .............. *G01J 1/44* (2013.01); *G01J 1/4228* (2013.01); *G02C 7/04* (2013.01); *G02C 7/049* (2013.01); *G02C 11/10* (2013.01); *H04N 5/361* (2013.01); *H04N 5/374* (2013.01)

(58) Field of Classification Search
CPC .......... G02C 11/10; G02C 7/049; G02C 7/04; H04N 5/374; H04N 5/361; H04N 5/3745; H04N 5/357; G01J 1/44; G01J 1/4228
See application file for complete search history.

(56) References Cited

U.S. PATENT DOCUMENTS

| | | | |
|---|---|---|---|
| 5,982,318 A | 11/1999 | Yiannoulos | |
| 6,313,457 B1 * | 11/2001 | Bauer | G01J 1/46 |
| | | | 250/214 C |

(Continued)

FOREIGN PATENT DOCUMENTS

| | | | |
|---|---|---|---|
| EP | 2772789 A1 | 9/2014 | |
| EP | 2851738 A2 | 3/2015 | |
| WO | WO 2014119103 A1 * | 8/2014 | ............. G01P 13/00 |

*Primary Examiner* — Que T Le
*Assistant Examiner* — Jennifer Bennett
(74) *Attorney, Agent, or Firm* — Carl J. Evens

(57) ABSTRACT

An anti-aliasing photodetector system for a powered ophthalmic device, such as a contact lens, may be utilized for any number of functions. The anti-aliasing photodetector system converts current from an array of photodetectors into a voltage for use in other aspects of the powered ophthalmic device. The anti-aliasing photodetector system comprises a photodiode array including a plurality of individual photodiodes, an integrate-and-hold circuit, including a capacitor and switch to convert current to voltage, and an analog-to-digital converter. The anti-aliasing photodetector system provides for low power consumption, a wide dynamic range, noise rejection, and is capable of detecting incident ambient visible light as well as incident infrared light.

8 Claims, 7 Drawing Sheets

(56) References Cited

U.S. PATENT DOCUMENTS

| | | | |
|---|---|---|---|
| 6,693,670 B1 * | 2/2004 | Stark | H04N 5/343 |
| | | | 348/241 |
| 2004/0169128 A1 * | 9/2004 | Mizuno | G01J 1/44 |
| | | | 250/214 R |
| 2014/0027611 A1 | 1/2014 | Patel | |
| 2014/0240655 A1 | 8/2014 | Pugh | |
| 2014/0375855 A1 * | 12/2014 | Nishihara | H01L 27/14603 |
| | | | 348/301 |
| 2015/0323670 A1 * | 11/2015 | Shirasaka | G01P 13/00 |
| | | | 250/206.1 |

\* cited by examiner

ANTI-ALIASING PHOTODETECTOR SYSTEM

BACKGROUND OF THE INVENTION

1. Field of the Invention

The present invention relates to a powered or electronic ophthalmic lens or other similar device and more particularly, to an anti-aliasing photodetector circuit, including an integrator having at least one capacitor and switch to convert current to voltage for use in low-power and/or high dynamic range applications with adequate noise rejection/suppression.

2. Discussion of the Related Art

As electronic devices continue to be miniaturized, it is becoming increasingly more likely to create wearable or embeddable microelectronic devices for a variety of uses. Such uses may include monitoring aspects of body chemistry, administering controlled dosages of medications or therapeutic agents via various mechanisms, including automatically, in response to measurements, or in response to external control signals, and augmenting the performance of organs or tissues. Examples of such devices include glucose infusion pumps, pacemakers, defibrillators, ventricular assist devices and neurostimulators. A new, particularly useful field of application is in ophthalmic wearable lenses and contact lenses. For example, a wearable lens may incorporate a lens assembly having an electronically adjustable focus to augment or enhance performance of the eye. In another example, either with or without adjustable focus, a wearable contact lens may incorporate electronic sensors to detect concentrations of particular chemicals in the pre-corneal (tear) film. The use of embedded electronics in a lens assembly introduces a potential requirement for communication with the electronics, for a method of powering and/or re-energizing the electronics, for interconnecting the electronics, for internal and external sensing and/or monitoring, and for control of the electronics and the overall function of the lens.

The human eye has the ability to discern millions of colors, adjust easily to shifting light conditions, and transmit signals or information to the brain at a rate exceeding that of a high-speed internet connection. Lenses, such as contact lenses and intraocular lenses, currently are utilized to correct vision defects such as myopia (nearsightedness), hyperopia (farsightedness), presbyopia and astigmatism. However, properly designed lenses incorporating additional components may be utilized to enhance vision as well as to correct vision defects.

Contact lenses may be utilized to correct myopia, hyperopia, astigmatism as well as other visual acuity defects. Contact lenses may also be utilized to enhance the natural appearance of the wearer's eyes. Contact lenses or "contacts" are simply lenses placed on the anterior surface of the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability and are generally more comfortable to wear than the contact lenses made of the earlier hard materials.

Conventional contact lenses are polymeric structures with specific shapes to correct various vision problems as briefly set forth above. To achieve enhanced functionality, various circuits and components have to be integrated into these polymeric structures. For example, control circuits, microprocessors, communication devices, power supplies, sensors, actuators, light-emitting diodes, and miniature antennas may be integrated into contact lenses via custom-built optoelectronic components to not only correct vision, but to enhance vision as well as provide additional functionality as is explained herein. Electronic and/or powered contract lenses may be designed to provide enhanced vision via zoom-in and zoom-out capabilities, or just simply modifying the refractive capabilities of the lenses. Electronic and/or powered contact lenses may be designed to enhance color and resolution, to display textural information, to translate speech into captions in real time, to offer visual cues from a navigation system, and to provide image processing and internet access. The lenses may be designed to allow the wearer to see in low-light conditions. The properly designed electronics and/or arrangement of electronics on lenses may allow for projecting an image onto the retina, for example, without a variable-focus optic lens, provide novelty image displays and even provide wakeup alerts. Alternately, or in addition to any of these functions or similar functions, the contact lenses may incorporate components for the noninvasive monitoring of the wearer's biomarkers and health indicators. For example, sensors built into the lenses may allow a diabetic patient to keep tabs on blood sugar levels by analyzing components of the tear film without the need for drawing blood. In addition, an appropriately configured lens may incorporate sensors for monitoring cholesterol, sodium, and potassium levels, as well as other biological markers. This, coupled with a wireless data transmitter, could allow a physician to have almost immediate access to a patient's blood chemistry without the need for the patient to waste time getting to a laboratory and having blood drawn. In addition, sensors built into the lenses may be utilized to detect light incident on the eye to compensate for ambient light conditions or for use in determining blink patterns.

The proper combination of devices could yield potentially unlimited functionality; however, there are a number of difficulties associated with the incorporation of extra components on a piece of optical-grade polymer. In general, it is difficult to manufacture such components directly on the lens for a number of reasons, as well as mounting and interconnecting planar devices on a non-planar surface. It is also difficult to manufacture to scale. The components to be placed on or in the lens need to be miniaturized and integrated onto just 1.5 square centimeters of a transparent polymer while protecting the components from the liquid environment on the eye. It is also difficult to make a contact lens comfortable and safe for the wearer with the added thickness of additional components.

Given the area and volume constraints of an ophthalmic device such as a contact lens, and the environment in which it is to be utilized, the physical realization of the device must overcome a number of problems, including mounting and interconnecting a number of electronic components on a non-planar surface, the bulk of which comprises optic plastic. Accordingly, there exists a need for providing a mechanically and electrically robust electronic contact lens.

As these are powered lenses, energy or more particularly current consumption, to run the electronics is a concern given battery technology on the scale for an ophthalmic lens. In addition to normal current consumption, powered devices or systems of this nature generally require standby current reserves, precise voltage control and switching capabilities to ensure operation over a potentially wide range of operating parameters, and burst consumption, for example, up to eighteen (18) hours on a single charge, after potentially remaining idle for years. Accordingly, there exists a need for a system that is optimized for low-cost, long-term reliable service, safety and size while having the required low power consumption.

In addition, because of the complexity of the functionality associated with a powered lens and the high level of interaction between all of the components comprising a powered lens, there is a need to coordinate and control the overall operation of the electronics and optics comprising a powered ophthalmic lens. Accordingly, there is a need for a system to control the operation of all of the other components that is safe, low-cost, and reliable, has a low rate of power consumption and is scalable for incorporation into an ophthalmic lens.

Powered or electronic ophthalmic lenses may employ ambient or infrared light sensors to detect ambient lighting conditions, blinking by the wearer, and/or visible or infrared communication signals from another device. Blink detection or light-based communication may be utilized as a means to control one or more aspects of a powered ophthalmic lens. The human eye is capable of operating over a large dynamic range of light levels from approximately 1 lux to over 100,000 lux. Light sensors suitable for use in powered ophthalmic lenses must therefore be capable of operating over a very wide dynamic range of ambient light levels. Further, the lighting environments encountered in use may include light sources that create noise and interference in the incident light energy. For example, fluorescent office lighting has a significant ripple at twice the line frequency, with an amplitude on the order of 30 percent of the average light level varying at a rate of 120 Hz when operating on a 60 Hz electrical system as in the United States.

Ambient light sensors or photodetectors are utilized in many systems and products, for example, on televisions to adjust brightness according to the room light, on lights to switch on at dusk, and on phones to adjust the screen brightness. Traditional photodetector systems employ a photodiode to generate a photocurrent proportional to incident light energy and an opamp circuit arranged as a transimpedance amplifier to provide a voltage signal to control circuits that implement the desired functions, such as remote control or screen brightness adjustment. Some remote control systems employ an ambient light rejection filter and receive an amplitude-modulated carrier having a frequency in the range of 30 kHz to 50 kHz which is passed to a bandpass filtering stage to pass the desired modulated carrier signal and reject unwanted signals. However, these currently utilized photo detector systems do not have low enough power consumption or high enough dynamic range for use in powered ophthalmic lenses. In addition the use of a bandpass filter and/or ambient light rejection filters for infrared communication prevents detection of ambient lighting levels with the same sensor, and would require additional circuitry or sensors for ambient light and blink detection.

Accordingly, there exists a need for a photodetector system suitable for incorporation into powered or electronic ophthalmic lenses. The photodetector system being utilized preferably has low power consumption, a wide dynamic range, noise rejection, and the capability to detect both ambient visible light and infrared light.

SUMMARY OF THE INVENTION

The powered or electronic ophthalmic lens comprising an anti-aliasing photodetector system in accordance with the present invention overcomes the limitations associated with the prior art as briefly described above.

In accordance with one aspect, the present invention is directed to a powered ophthalmic device. The powered ophthalmic device comprises a first sensor including one or more photodiodes producing a first output current; and a first integrator receiving the first output current and converting it to a first output voltage, wherein the first integrator comprises a first switch and a first capacitor, and is configured to integrate the first output current over a predetermined integration period of time.

In accordance with another aspect, the present invention is directed to a powered ophthalmic device. The powered ophthalmic device comprises a first sensor including one or more photodiodes producing a first output current, a first integrator receiving the first output current and converting it to a first output voltage for downstream use, wherein the first integrator comprises a first switch and a first capacitor, and is configured to integrate the first output current over a predetermined integration period of time, and a reference voltage source, wherein the first switch is configured to selectively couple the first capacitor to the voltage reference source; wherein a component of the first output current from the photodiodes is proportional to incident light, the predetermined integration period of time is a function of a period of an undesired signal, the first sensor is further configured to firstly close the first switch to precharge the first capacitor for a precharge time interval and then to secondly open the first switch for a predetermined integration period of time, and the one or more photodiodes are selectively coupled to the first capacitor such that the gain and/or sensitivity of the sensor can be varied.

In accordance with still yet another aspect, the present invention is directed to a light sensing device. The light sensing device comprise a first sensor including one or more photodiodes producing a first output current, and a first integrator receiving the first output current and converting it to a first output voltage, wherein the first integrator comprises a first switch and a first capacitor, and is configured to integrate the first output current over a predetermined integration period of time.

The present invention relates to a powered ophthalmic device, such as a contact lens, comprising an electronic system, which performs any number of functions, including actuating a variable-focus optic if included. The electronic system includes one or more batteries or other power sources, power management circuitry, one or more sensors, clock generation circuitry, control algorithms and circuitry, and lens driver circuitry. In addition, the electronic system in accordance with the present invention further comprises a photodetector system for converting current from an array of photodetectors into a voltage for use in other aspects of the powered ophthalmic device.

The photodetector system of the present invention comprises a photodiode array including a plurality of individual photodiodes, an integrate-and-hold circuit including a capacitor and switch to convert current to voltage, and an analog-to-digital converter. The number of photodiodes comprising the array may be varied to alter the sensitivity of the system. The integrate-and-hold circuit replaces an operational amplifier thereby reducing the power consumption of the device and also acts as an effective anti-aliasing filter, thereby reducing the overall size of the system as no additional filters are required. In other embodiments, additional circuitry may be utilized to compensate for dark or leakage current. The photodetector system of the present invention provides for low power consumption, a wide dynamic range, noise rejection, and the capability to detect incident ambient visible light as well as incident infrared light.

The photodetector system in accordance with the current invention overcomes the limitations associated with the prior art as briefly described above. More specifically, the photodetector system of the present invention is able to detect incident visible light and infrared communication signals over a wide dynamic range of ambient light levels and operate with very low power. The photodetector system of the present invention is also able to be more easily integrated into a powered ophthalmic device such as a contact lens given its size.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
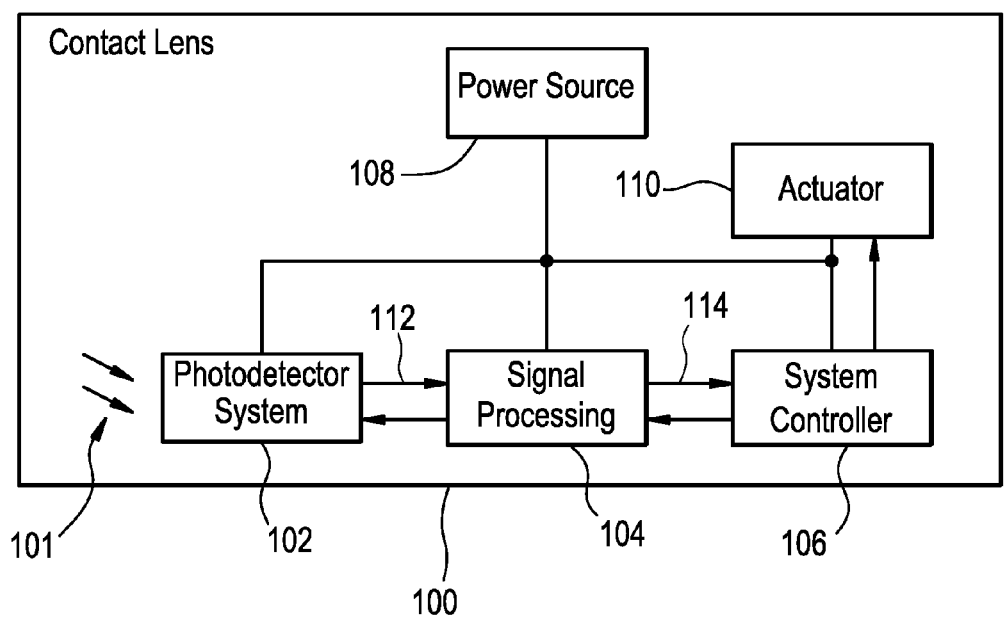
FIG. 1 illustrates an exemplary contact lens comprising a photodetector system in accordance with the present invention.

Conventional contact lenses are polymeric structures with specific shapes to correct various vision problems as briefly set forth above. To achieve enhanced functionality, various circuits and components may be integrated into these polymeric structures. For example, control circuits, microprocessors, communication devices, power supplies, sensors, actuators, light-emitting diodes, and miniature antennas may be integrated into contact lenses via custom-built optoelectronic components to not only correct vision, but to enhance vision as well as provide additional functionality as is explained herein. Electronic and/or powered contact lenses may be designed to provide enhanced vision via zoom-in and zoom-out capabilities, or just simply modifying the refractive capabilities of the lenses. Electronic and/or powered contact lenses may be designed to enhance color and resolution, to display textural information, to translate speech into captions in real time, to offer visual cues from a navigation system, and to provide image processing and internet access. The lenses may be designed to allow the wearer to see in low light conditions. The properly designed electronics and/or arrangement of electronics on lenses may allow for projecting an image onto the retina, for example, without a variable focus optic lens, provide novelty image displays and even provide wakeup alerts. Alternately, or in addition to any of these functions or similar functions, the contact lenses may incorporate components for the noninvasive monitoring of the wearer's biomarkers and health indicators. For example, sensors built into the lenses may allow a diabetic patient to keep tabs on blood sugar levels by analyzing components of the tear film without the need for drawing blood. In addition, an appropriately configured lens may incorporate sensors for monitoring cholesterol, sodium, and potassium levels, as well as other biological markers. This coupled with a wireless data transmitter could allow a physician to have almost immediate access to a patient's blood chemistry without the need for the patient to waste time getting to a laboratory and having blood drawn. In addition, sensors built into the lenses may be utilized to detect light incident on the eye to compensate for ambient light conditions or for use in determining blink patterns.

The powered or electronic contact lens of the present invention comprises the necessary elements to correct and/or enhance the vision of patients with one or more of the above described vision defects or otherwise perform a useful ophthalmic function. In addition, the electronic contact lens may be utilized simply to enhance normal vision or provide a wide variety of functionality as described above. The electronic contact lens may comprise a variable focus optic lens, an assembled front optic embedded into a contact lens or just simply embedding electronics without a lens for any suitable functionality. The electronic lens of the present invention may be incorporated into any number of contact lenses as described above. In addition, intraocular lenses may also incorporate the various components and functionality described herein. However, for ease of explanation, the disclosure will focus on an electronic contact lens to correct vision defects intended for single-use daily disposability.

The present invention may be employed in a powered ophthalmic lens or powered contact lens comprising an electronic system, which actuates a variable-focus optic or any other device or devices configured to implement any number of numerous functions that may be performed. The electronic system includes one or more batteries or other power sources, power management circuitry, one or more sensors, clock generation circuitry, control algorithms and circuitry, and lens driver circuitry. The complexity of these components may vary depending on the required or desired functionality of the lens.

Control of an electronic or a powered ophthalmic lens may be accomplished through a manually operated external device that communicates with the lens, such as a hand-held remote unit. For example, a fob may wirelessly communicate with the powered lens based upon manual input from the wearer. Alternately, control of the powered ophthalmic lens may be accomplished via feedback or control signals directly from the wearer. For example, sensors built into the lens may detect blinks and/or blink patterns. Based upon the pattern or sequence of blinks, the powered ophthalmic lens may change state, for example, its refractive power in order to either focus on a near object or a distant object.

Alternately, blink detection in a powered or electronic ophthalmic lens may be used for other various uses where there is interaction between the user and the electronic contact lens, such as activating another electronic device, or sending a command to another electronic device. For example, blink detection in an ophthalmic lens may be used in conjunction with a camera on a computer wherein the camera keeps track of where the eye(s) moves on the computer screen, and when the user executes a blink sequence that it detected, it causes the mouse pointer to perform a command, such as double-clicking on an item, highlighting an item, or selecting a menu item.

A blink detection algorithm may be a component of the system controller which detects characteristics of blinks, for example, is the lid open or closed, the duration of the blink, the inter-blink duration, and the number of blinks in a given time period. The algorithm in accordance with the present invention relies on sampling light incident on the eye at a certain sample rate. Pre-determined blink patterns are stored and compared to the recent history of incident light samples. When patterns match, the blink detection algorithm may trigger activity in the system controller, for example, to activate the lens driver to change the refractive power of the lens.

Blinking is the rapid closing and opening of the eyelids and is an essential function of the eye. Blinking protects the eye from foreign objects, for example, individuals blink when objects unexpectedly appear in proximity to the eye. Blinking provides lubrication over the anterior surface of the eye by spreading tears. Blinking also serves to remove contaminants and/or irritants from the eye. Normally, blinking is done automatically, but external stimuli may contribute as in the case with irritants. However, blinking may also be purposeful, for example, for individuals who are unable to communicate verbally or with gestures can blink once for yes and twice for no. The blink detection algorithm and system of the present invention utilizes blinking patterns that cannot be confused with normal blinking response. In other words, if blinking is to be utilized as a means for controlling an action, then the particular pattern selected for a given action cannot occur at random; otherwise inadvertent actions may occur. As blink speed may be affected by a number of factors, including fatigue, eye injury, medication and disease, blinking patterns for control purposes preferably account for these and any other variables that affect blinking. The average length of involuntary blinks is in the range of about one hundred (100) to four hundred (400) milliseconds. Average adult men and women blink at a rate of ten (10) involuntary blinks per minute, and the average time between involuntary blinks is about 0.3 to seventy (70) seconds. It is important to note that an individual's blink rate may change due to other factors, for example, blinking decreases when an individual is concentrating or reading and increases when an individual is bored.

However, as set forth above, the photodetector system of the present invention is preferably designed for additional functionality beyond that of blink detection. For example, the photodetector system of the present invention may be utilized to detect incident visible light and/or infrared communication signals for any purpose.

FIG. 1 illustrates, in block diagram form, an exemplary powered or electronic contact lens 100 comprising a photodetector system 102, a signal processing circuit 104, a system controller 106, a power source 108 and an actuator 110. When the contact lens 100 is placed onto the front surface of a user's eye the photodetector system 102 may be utilized to detect ambient light, variation in incident light levels or infrared communication signals. The functionality and operation of each of the components comprising the exemplary powered contact lens 100 is described below.

In this exemplary embodiment, the photodetector system 102 may be embedded into the contact lens 100, receive ambient or infrared light 101, and provide to the signal processing circuit 104 a data signal 112 having a value representative of the light energy incident on the contact lens 100. The photodetector system 102 and the signal processing circuit 104 may be configured for two-way communication. In other words, the signal processing circuit 104 may provide one or more signals to the photodetector system 102, examples of which are set forth subsequently. The signal processing circuit 104 may be utilized for digital signal processing, including one or more of filtering, processing, detecting, and otherwise manipulating/processing data to permit incident light detection for downstream use. The signal processing circuit 104 may be configured to detect predetermined sequences of light variation indicative of specific blink patterns or infrared communication protocols. Upon detection of a predetermined sequence the signal processing circuit 104 may provide an indication signal 114 to the system controller 106, and in response the system controller 106 may act to change the state of actuator 110, for example, by enabling, disabling or changing an operating parameter such as an amplitude or duty cycle of the actuator 110. The system controller 106 and the signal processing circuit 104 may be configured for two-way communication. In other words, the system controller 106 may provide one or more signals to the signal processing circuit 104, examples of which are set forth subsequently.

The system controller 106 may provide a feedback signal to the photodetector system 102 to adjust the gain of the photodetector system 102 in response to ambient light levels in order to maximize the dynamic range of the system.

In some embodiments the signal processing circuit 104 may be implemented as a digital logic circuit and the photodetector system 102 configured to provide a digital data signal 112. The system controller 106 also may be implemented as a digital logic circuit and implemented as a separate component or integrated with signal processing circuit 104. The signal processing circuit 104 and system controller 106 may be implemented in custom logic, reprogrammable logic or one or more microcontrollers as are well known to those of ordinary skill in the art. The signal processing circuit 104 and system controller 106 may comprise associated memory to maintain a history of values of the data signal 112 or the state of the system. It is important to note that any suitable arrangement and/or configuration may be utilized.

A power source 108 supplies power for numerous components comprising the contact lens 100. The power may be supplied from a battery, energy harvester, or other suitable means as is known to one of ordinary skill in the art. Essentially, any type of power source 108 may be utilized to provide reliable power for all other components of the system. A blink sequence or an infrared communication signal having a predetermined sequence or message value may be utilized to change the state of the system and/or the system controller as set forth above. Furthermore, the system controller 106 may control other aspects of a powered contact lens depending on input from the signal processor 104, for example, changing the focus or refractive power of an electronically controlled lens through the actuator 110. As illustrated, the power source 108 is connected to each of the other components and would be connected to any additional element or functional block requiring power.

The actuator 110 may comprise any suitable device for implementing a specific action based upon a received command signal. For example, if a blink activation sequence is detected as described above, the system controller 106 may enable the actuator 110 to control a variable-optic element of an electronic or powered lens. The actuator 110 may comprise an electrical device, a mechanical device, a magnetic device, or any combination thereof. The actuator 110 receives a signal from the system controller 106 in addition to power from the power source 108 and produces some action based on the signal from the system controller 106. For example, if the system controller 106 signal is indicative of the wearer trying to focus on a near object, the actuator 110 may be utilized to change the refractive power of the electronic ophthalmic lens, for example, via a dynamic multi-liquid optic zone. In an alternate exemplary embodiment, the system controller 106 may output a signal indicating that a therapeutic agent should be delivered to the eye(s). In this exemplary embodiment, the actuator 110 may comprise a pump and reservoir, for example, a microelectromechanical system (MEMS) pump. As set forth above, the powered lens of the present invention may provide various functionality; accordingly, one or more actuators may be variously configured to implement the functionality.

Figure 2:
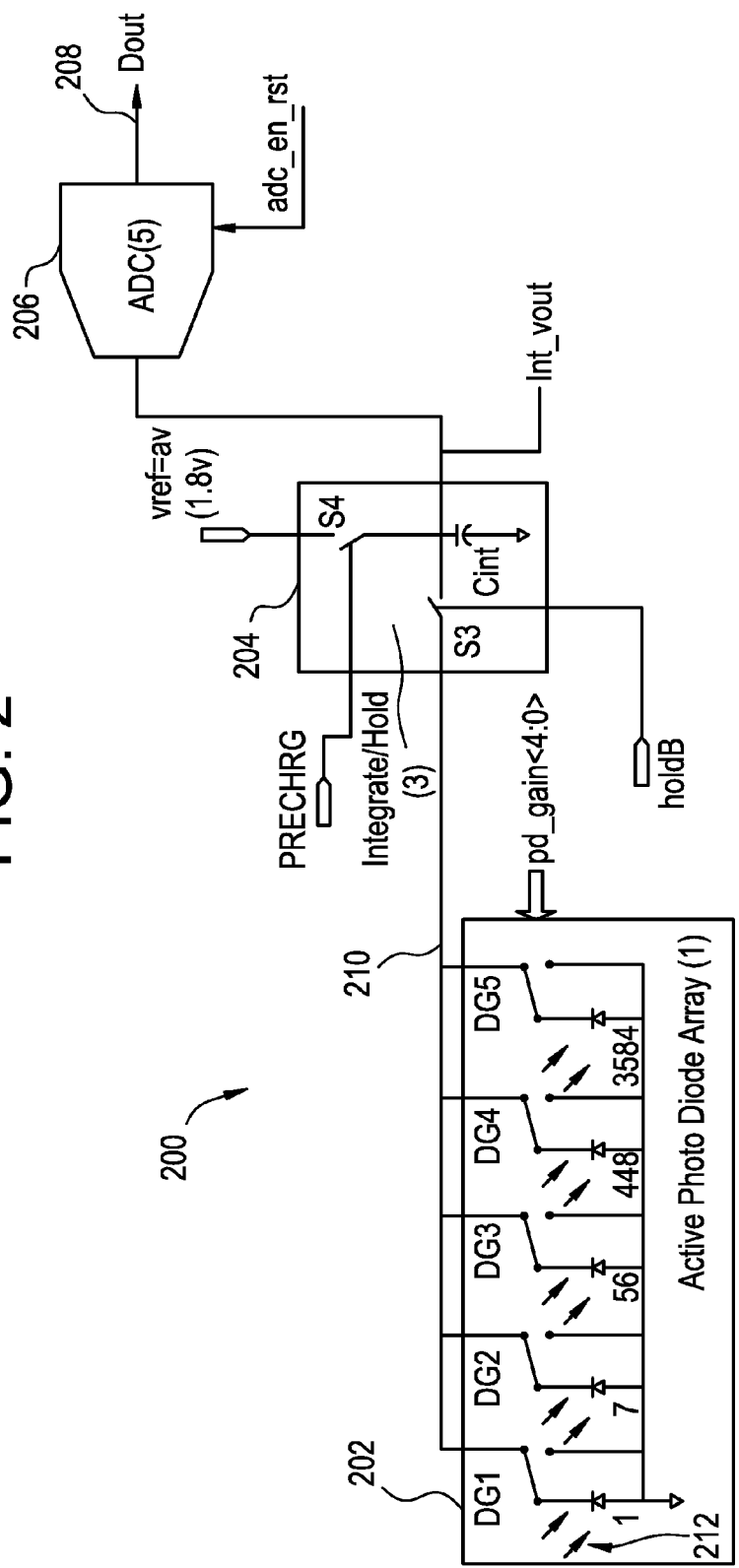
FIG. 2 is a diagrammatic representation of a photodetector system in accordance with the present invention.

FIG. 2 illustrates, in part schematic diagram, part block diagram form, a photodetector system 200 in accordance with an exemplary embodiment of the present invention. The photodetector system 200 comprises a photodiode array 202 including a plurality of individual photodiodes, an integrate-and-hold circuit 204, and an analog-to-digital converter 206 providing an output data signal 208. The photodiode array 202 comprises one or more photodiodes DG1 to DG5 having cathode terminals selectively coupled to a cathode node 210. In other exemplary embodiments, the photodiode array 202 may comprise additional photodiodes, fewer photodiodes or even a single photodiode. The selective coupling is determined by a value of a gain signal pd_gain which may be provided by a signal processing circuit, for example, signal processing circuit 104 illustrated in FIG. 1. A detailed explanation of the photodiode construct is given subsequently. In some embodiments when one of the one or more photodiodes DG1 to DG5 is not coupled to cathode node 210, its cathode terminal may be coupled to a circuit ground to discharge the parasitic capacitance associated with the semiconductor diode junction. The one or more photodiodes DG1 to DG5 generate photocurrent in response to incident light 212. Silicon semiconductor photodiodes typically generate photocurrent having a value proportional to incident light energy and also generate a "dark current" due to leakage mechanisms and which is present independent of incident light and may be proportional to temperature and voltage across the photodiode. Therefore the total current generated by the photodiode array 202 comprises a component determined by incident light 212 and a dark current component generated by the selected one or more photodiodes DG1 to DG5. Silicon semiconductor photodiodes further comprise a junction capacitance.

Integrate-and-hold circuit 204 comprises an integration capacitor Cint, a hold switch S3 and a precharge switch S4. Hold switch S3 selectively couples cathode node 210 to the integration capacitor $C_{int}$ based on a value of a hold signal holdB. Preferably the hold switch S3 is configured to be closed when the hold signal holdB presents a logic one or high voltage value and to be open when the hold signal holdB presents a logic zero or low voltage value. Precharge switch S4 selectively couples the integration capacitor $C_{int}$ to a reference voltage vref based on a value of a precharge signal PRECHRG. Preferably the precharge switch S4 is configured to be closed when the precharge signal PRECHRG presents a logic one or high voltage value and to be open when the precharge signal PRECHRG presents a logic zero or low voltage value. The integration capacitor $C_{int}$ is further coupled to an integrated output voltage node Int_vout. In operation, integration capacitor $C_{int}$ is precharged to reference voltage vref and then integrates the current drawn by the photodiode array 202 to develop an integrated output voltage Int_vout.

Analog-to-digital converter 206 is configured to receive the voltage developed on integration capacitor $C_{int}$ and provided on integrated output voltage node Int_vout and to provide a digital output value Dout representative of the integrated output voltage. The analog-to-digital converter 206 may be configured to receive an enable signal adc_en_rst. In some exemplary embodiments the analog-to-digital converter 206 is configured to be reset when adc_en_rst presents a logic zero value, and to commence a conversion operation when adc_en_rst transitions to a logic one value.

In this exemplary embodiment the gain signal pd_gain is a five-bit digital signal notated pd_gain<4:0> allowing the total photocurrent generated by photodiode array 202 to be appropriately scaled to accommodate the incident light intensity. Further in this exemplary embodiment, photodiodes DG1, DG2, DG3, DG4 and DG5 comprises 1, 7, 56, 448 and 3584 photodiode elements, respectively. At very high incident light intensity, photocurrent from only one photodiode element cathode (DG1) may be output to the integrator with all remaining cathodes shorted to ground. At lower light intensity, photodiodes DG1 and DG2 may both be selected providing eight times the sensitivity of photodiode DG1. Likewise for progressively lower intensities, selection of photodiodes DG1, DG2, and DG3 provides 64 times the sensitivity of photodiode DG1, and selection of photodiode groups DG1 through DG4 provides 512 times the sensitivity of photodiode DG1. At the lowest usable light intensities, selection of photodiodes DG1 through DG5 provides 4096 times the sensitivity of photodiode by selecting all 4096 photodiode elements in the array. This allows digital control via the gain signal pd_gain of the sensitivity of the photodiode array 202 over a 72 dB range.

Figure 3:
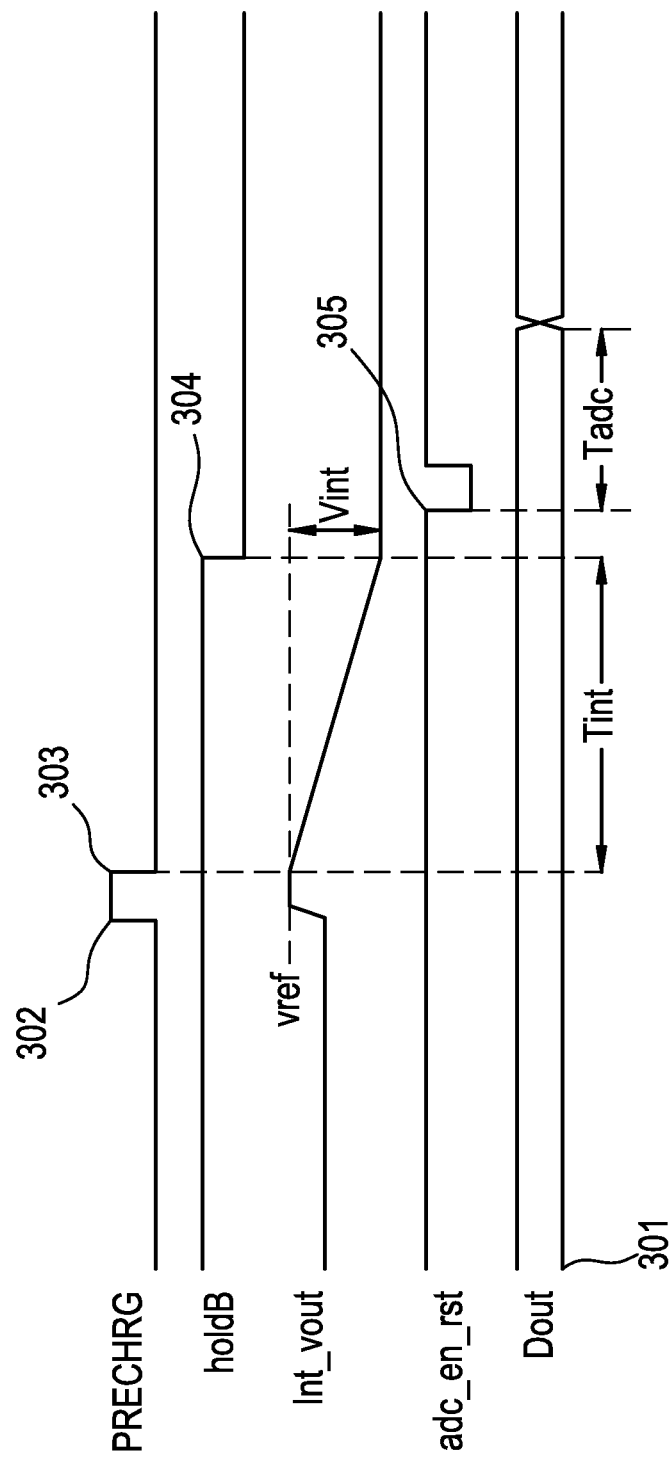
FIG. 3 is an exemplary timing diagram of the signals associated with the photodetector system in accordance with the present invention.

FIG. 3 illustrates a timing diagram of an integration and conversion sequence of the exemplary photodetector system 200 illustrated in FIG. 2. First, at the time indicated by 301, the hold signal holdB is set to a high voltage value closing the hold switch S3 and thus coupling the integration capacitor $C_{int}$ to cathode node 210 and photodiode array 202. Then at 302 the precharge signal PRECHRG is asserted, closing precharge switch S4 and coupling integration capacitor $C_{int}$, cathode node 210 and the junction capacitance of the selected one or more photodiodes DG1 to DG5 to reference voltage vref. It is important to note that while the voltage on the integration capacitor $C_{int}$, as illustrated in the trace labeled Int_vout, is shown as a constant value prior to time 302, the voltage may be any reasonable value as determined by the incident light on the photodetector system (FIG. 2), time elapsed since prior actions and other similar functions as is understood by those of ordinary skill in the art. Next at 303 the precharge signal PRECHRG is de-asserted, disconnecting the reference voltage vref and allowing the current drawn by the photodiode array 202 to discharge integration capacitor $C_{int}$. After an integration time $T_{int}$, the hold signal holdB is set to a low voltage value at 304, opening the hold switch S3. Then at 305 the enable signal adc_en_rst is driven to a logic zero value and subsequently to a logic one value to start a conversion operation. After a conversion time Tadc the digital output value Dout presents a new value representative of integrated voltage Vint. In this exemplary embodiment the integration voltage is represented by the difference between the reference voltage vref and the voltage on the integration capacitor $C_{int}$ provided on integrated output voltage node Int_vout.

Each of the one or more photodiodes DG1 to DG5 may be modeled as a current source. The total current generated by the photodiode array 202 may be integrated with the integration capacitor $C_{int}$. No op-amps are required in the signal chain which in turn allows for very low power dissipation. At the end of the integration time $T_{int}$, the resulting voltage at the integrator output is given by $$\text{Int\_vout} = \text{vref} - (\text{IPD}/C_{int}) \cdot T_{int}, \qquad (1)$$

where $T_{int}$ is the integration period and IPD is total current generated by the photodiode array 202. As seen from this equation, an equivalent resistance, Rgain, which determines the trans-resistance gain, and that transforms the input current to the output voltage, is given by $$R\text{gain} = T_{int}/C_{int}. \qquad (2)$$

As may be seen from equation 2, Rgain is directly proportional to $T_{int}$ and inversely proportional to $C_{int}$. For purposes of this discussion, this may be thought of as being a time-varying resistor. So, for example, to increase the gain, we can increase the integration interval $T_{int}$, and/or reduce the integration capacitor $C_{int}$. A higher gain value may therefore be achieved with a smaller capacitor and hence translates to a smaller die size, once again, a preferable design parameter. To adjust the gain, one could therefore switch in or out additional capacitance and/or change the integration time $T_{int}$, for example, via digital control.

Note that extremely large values for Rgain may be achieved with very small area, and thus the circuit of the present invention is suitable for integration in a semiconductor die and for use in a biomedical device such as a powered contact lens. For example, with $C_{int}$=1 pF and $T_{int}$=100 MS, Rgain=100 GΩ, which may be achieved in an area of only approximately 14 μm×14 μm in a typical 0.18 μm complementary metal-oxide semiconductor (CMOS) process.

The voltage provided on integrated output voltage node Int_vout (equation 1), is then digitized by the analog-to-digital converter 206. A full-scale output of the analog-to-digital converter corresponds to Vint=vref and to a voltage of 0V on integrated output voltage node Int_vout, and corresponds to a full-scale photo-current IPD(FS) given by $$(FS) = C\text{int} \cdot \text{vref}/T\text{int}. \qquad (3)$$

A periodically time-varying impulse response corresponding to the integration and hold operation may be described by the time varying impulse response h(τ,t), wherein $$h(\tau,t) = u(\tau) - u(\tau + (N-1) \cdot T_{int} - t), \qquad (4)$$

over interval $(N-1) \cdot T_{int} < t \leq (N \cdot T_{int})$, N=1, 2, 3, . . . .

Equation 4 gives the impulse response h(τ,t) at time t, where N is an integer representing a given integration time interval. Equation 4 shows that the time-varying impulse response is a pulse whose width increases linearly with t up to $t=T_{int}$. Then, at $t=T_{int}+$, the impulse-response pulse width drops back to zero width (it is reset), and begins to increase again until $t=2T_{int}$ (it is periodic, with period=$T_{int}$). The plus sign, +, in $t=T_{int}+$ is meant to indicate that the calculation starts at the instant after $t=T_{int}$.

At the end of each integration interval, we have $t=N*T_{int}$ (N=1, 2, 3, . . . ), and from equation 4, the impulse response is given by $$h(\tau, N \cdot T_{int}) = u(\tau) - u(\tau - T_{int}). \qquad (5)$$

The Laplace transform transfer function of the impulse response at the end of each integration interval (equation 5) is given by $$H(s) = [1 - e - (s \cdot T_{int})]/(s \cdot T_{int}). \qquad (6)$$

Letting s=j2πf in equation 6, and then simplifying, results in the Fourier transform of the integration and hold operation which is given by $$H(j2\pi f) = e^{-(j\pi \cdot T_{int} \cdot f)} \sin(\pi \cdot T_{int} \cdot f)/(\pi \cdot T_{int} \cdot f). \qquad (7)$$

As may be seen from equation 7, the resultant frequency response magnitude is inversely proportional to the frequency, f (which provides 20 dB/dec roll-off), and is punctuated by periodic zeros (notches).

Figure 4:
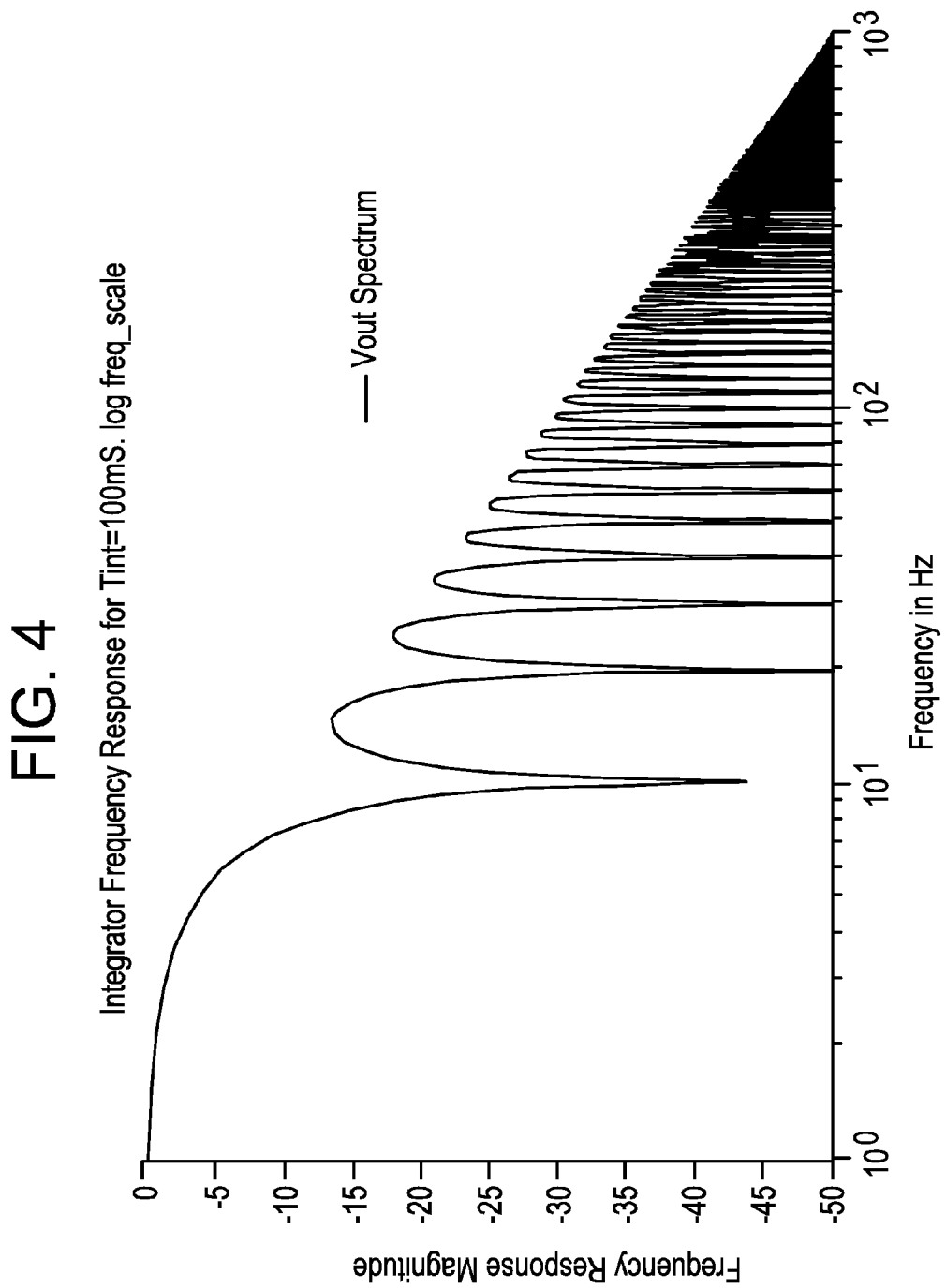
FIG. 4 is a graphical representation of a frequency response of the photodetector system in accordance with the present invention.

FIG. 4 illustrates the frequency response magnitude versus frequency for an integration time $T_{int}$ of 0.1 s and having periodic zeros (notches) at multiples of 10 Hz. It will be appreciated that the normalized frequency response of equation 7 is independent of $C_{int}$. That is, the corner frequency and shape of the frequency response is independent of $C_{int}$, and depends only on the length of the integration interval, $T_{int}$.

As may be seen in equation, the frequency response phase is perfectly linear with a delay of given by $$T\text{delay} = T_{int}/2. \qquad (8)$$

The periodic notches occur at frequencies, fN, which is given by $$fN = N/T_{int}. \qquad (9)$$

where N=1, 2, 3 . . . .

Choosing the ADC sampling frequency as $$fs = 1/T_{int} \qquad (10)$$

The frequency response illustrated in FIG. 4 with $T_{int}$=0.1 s (fs=10 Hz), has a 3 dB corner frequency of 4.4 Hz, transitioning to a first notch (infinite attenuation) at 10 Hz. The integration and hold operation therefore serves as a very effective anti-alias filter, attenuating frequencies very rapidly above the Nyquist frequency (fs/2). No additional anti-alias filter circuits are required for many ambient light or infrared communication applications, thus minimizing the required area for the photodetector system of the present invention.

The periodic notches also extend to multiples of AC line frequencies (50 Hz or 60 Hz). This has the added benefit of additional fluorescent light flicker rejection beyond the already approximately 30 dB of rejection at 100 Hz or 120 Hz resulting from the 20 dB/dec roll off above the 4.4 Hz corner. Another choice for $T_{int}$=1/Fs is 83.33 . . . ms providing notches at multiples of 12 Hz and a −3 dB corner frequency of 5.33 Hz.

The total current required for the integrate-and-reset function is given by the current required to pre-charge $C_{int}$ to vref every sampling period or cycle. The average current assuming the integration capacitor $C_{int}$ is fully discharged each cycle is given by $$I\text{avg} = \text{vref} \cdot C_{int}/T_{int}. \qquad (11)$$

By way of illustration, for a photodetector system having vref=1.8V, $C_{int}$=145 pF, and $T_{int}$=100 mS the average current Iavg=2.6 nA (nominal) for the integrator. This assumes that $C_{int}$ is fully discharged by the photodiode current every sampling period or cycle. It will be appreciated that the average supply current is equal to the average total current generated by the photodiode array 202.

Lower power dissipation therefore requires lower current generated by the photodiode array 202 and a smaller value of the integration capacitor $C_{int}$ for a full-scale transition over the integration time $T_{int}$. Overall, the optimal lowest power, smallest design may have a photodiode array 202 comprising minimum-size photodiode junctions and a small integration capacitor $C_{int}$. As will be appreciated by those skilled in the art, the smallest sizes may be limited by sampling noise, switch charge injection and other considerations related to circuit and device non-idealities.

Figure 5:
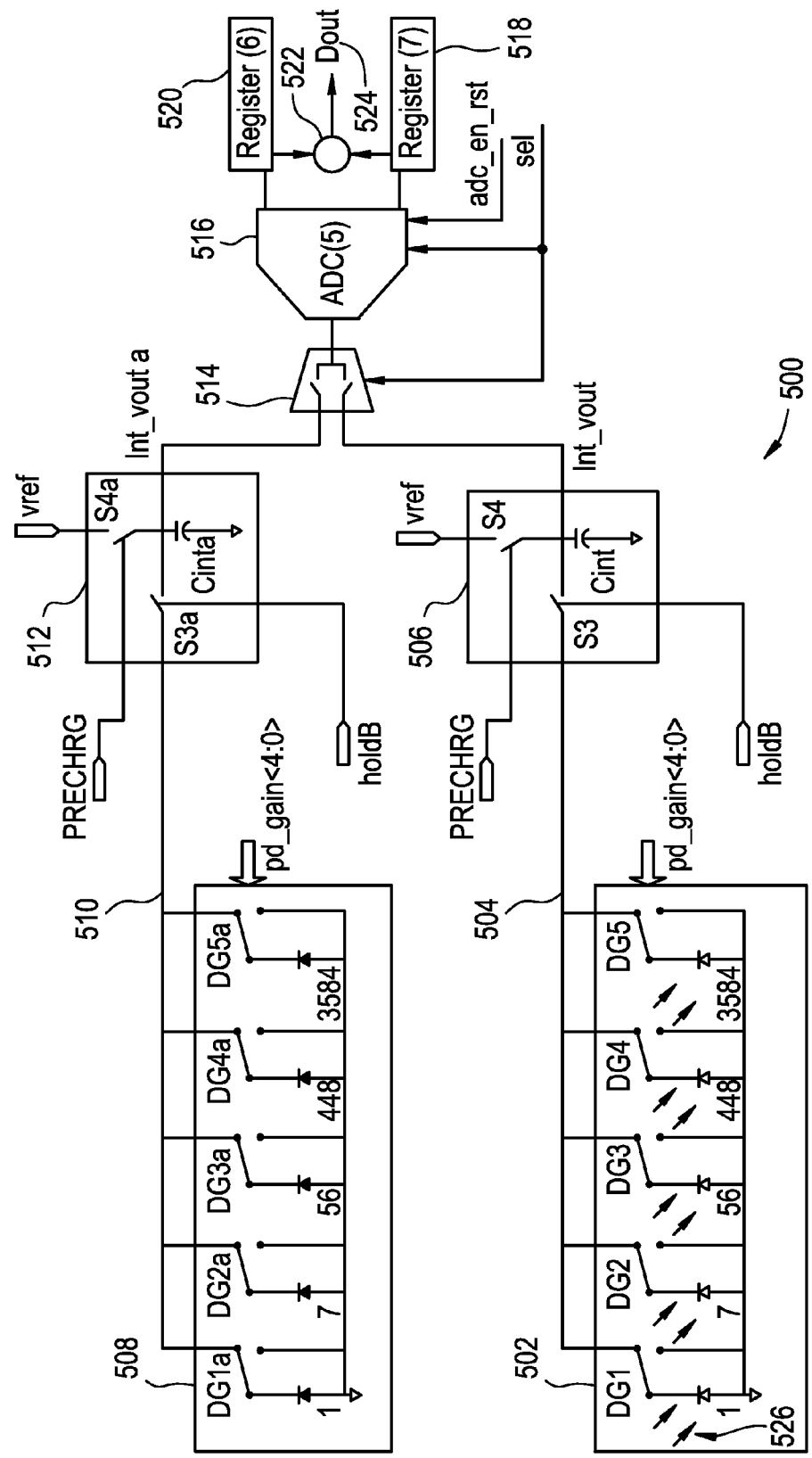
FIG. 5 is a diagrammatic representation of a photodetector system having dark current cancellation in accordance with the present invention.

FIG. 5 illustrates, in part schematic diagram, part block diagram form, a photodetector system 500 having dark current cancellation in accordance with another exemplary embodiment of the present invention. The photodetector system 500 comprises a photodiode array 502 comprising photodiodes DG1 to DG5 coupled to a first cathode node 504, a first integrate-and-hold circuit 506, a dark photodiode array 508 coupled to a second cathode node 510, a second integrate-and-hold circuit 512, an input select switch 514, an analog-to-digital converter 516, a first register 518, a second register 520 and a subtractor 522 providing an output data signal 524. The photodiode array 502 and the integrate-and-hold circuit 506 operate to develop a first integrated voltage Int_vout in a similar manner to the photodiode array 202 and the integrate-and-hold circuit 204, respectively, of the photodetector system 200 described above with respect to FIG. 2.

As set forth above, silicon semiconductor photodiodes generate a dark current due to leakage mechanisms and which is present independent of incident light and may be proportional to temperature and voltage across the photodiodes. Accordingly, a dark current photodiode array be utilized to compensate as described in detail subsequently. The dark current photodiode array 508 comprises one or more photodiodes DG1a to DG5a having cathode terminals selectively coupled to a cathode node 510. In a manner similar to the photodiode arrays 202 and 502, the selective coupling in the dark current photodiode array 508 is determined by a value of a pd_gain signal which may be provided by a signal processing circuit. In some exemplary embodiments when one of the one or more photodiodes DG1a to DG5a is not coupled to second cathode node 510, its cathode terminal may be coupled to a circuit ground to discharge the parasitic capacitance associated with the semiconductor diode junction. The one or more photodiodes DG1a to DG5a are covered with a light blocking layer, such as a metal layer, so that they do not generate photocurrent in response to incident light 526. However, any suitable light blocking layer or coating may be utilized. Therefore the total current generated by the dark photodiode array 508 comprises only a dark or leakage current component generated by the selected one or more photodiodes DG1a to DG5a. It will be appreciated by those skilled in the art that if the photodiodes DG1a to DG5a and DG1 to DG5 are manufactured together, for example, in the same silicon wafer, and if the corresponding photodiodes (DG1 and DG1a, DG2 and DG2a, etc.) have the same active dimensions and area, that the dark currents generated by photodiodes DG1a to DG5a are very similar in magnitude to dark currents generated by photodiodes DG1 to DG5 of photodiode array 502.

The second integrate-and-hold circuit 512 comprises a second integration capacitor $C_{inta}$, a second hold switch S3a and a second precharge switch S4a. Second hold switch S3a selectively couples second cathode node 510 to the second integration capacitor $C_{inta}$ based on a value of a hold signal holdB. Preferably the second hold switch S3a is configured to be closed when the hold signal holdB presents a logic one or high voltage value to be open when the hold signal holdB presents a logic zero or low voltage value. Second precharge switch S4s selectively couples the second integration capacitor $C_{inta}$ to a reference voltage vref based on a value of a precharge signal PRECHRG. Preferably the second precharge switch S4a is configured to be closed when the precharge signal PRECHRG presents a logic one or high voltage value to be open when the precharge signal PRECHRG presents a logic zero or low voltage value. The second integration capacitor $C_{inta}$ is further coupled to an integrated output voltage node Int_vout. In operation, the second integration capacitor $C_{inta}$ is precharged to reference voltage vref and then integrates the current drawn by the dark photodiode array 506 to develop a second integrated output voltage Int_vouta.

Input select switch 514 is configured to selectively couple one of either the first integrated output voltage Int_vout or the second integrated output voltage Int_vouta to an input of the analog-to-digital converter 516. The selective coupling may be determined based on a select control signal sel provided by a signal processing circuit or controller.

Analog-to-digital converter 516 is configured to receive the voltage selectively coupled by input select switch 514 and to provide a digital output value. In this exemplary embodiment the analog-to-digital converter 516 selectively stores the digital output value corresponding to integrated output voltage Int_vout in first register 518 and the digital output value corresponding to integrated output voltage Int_vouta in second register 520. The selective storing may be determined based on the select control signal sel. The analog-to-digital converter 516 may be configured to receive an enable signal adc_en_rst. In some exemplary embodiments the analog-to-digital converter 516 is configured to be reset when adc_en_rst presents a logic zero value and to commence a conversion operation when adc_en_rst transitions to a logic one value. The subtractor 522 generates output data signal 524 based on a difference between the values held in first register 518 and second register 520. In this manner the output data signal 514 represents the integrated photocurrent from photodiode array 502 and the difference in dark currents between photodiode array 502 and the dark photodiode array 508. If the dark currents are very similar in magnitude and if the integration times are the same then the difference in dark currents will be nearly zero, and thus the output data signal 514 will represent the integrated photocurrent from photodiode array 502.

In a manner similar to that described for the photodetector system 200, at very low light intensity, all 4096 photodiodes in the photodiode arrays 502 and 508 may be selected via a 5-bit gain control pd_gain<4:0>. This provides the maximum junction area for photocurrent generation providing the highest photo sensitivity, but also generates the highest dark current. For improved signal to noise ratio (SNR), or photocurrent to dark current ratio, the photodetector system 500 measures and mathematically cancels the unwanted dark current component, to the extent that the photodiode array 502 and the dark photodiode array 508 and the first integration and hold circuit 506 and the second integration and hold circuit 512, respectively, match.

Figure 6:
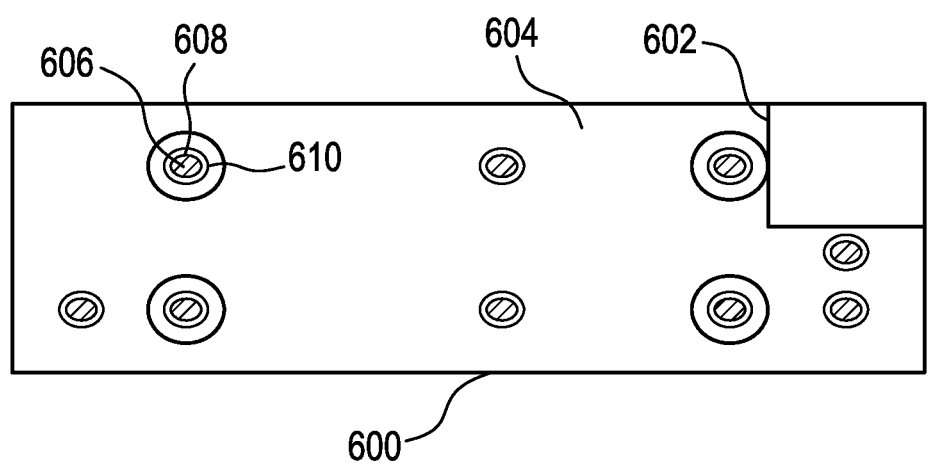
FIG. 6 is a diagrammatic representation of light-blocking and light-passing regions on an exemplary integrated circuit die in accordance with the present invention.

FIG. 6 illustrates exemplary light-blocking and light-passing features on an integrated circuit die 600. The integrated circuit die 600 comprises a light-passing region 602, a light-blocking region 604, bond pads 606, passivation openings 608, and light-blocking layer openings 610. The light-passing region 602 is located above the photodiode array or arrays (not illustrated), for example, an array of photodiodes implemented in the semiconductor process. In a preferred exemplary embodiment, the light-passing region 602 permits as much light as possible to reach the photodiodes thereby maximizing sensitivity. This may be done through removing polysilicon, metal, oxide, nitride, polyimide, and other layers above the photodiode array or arrays, as permitted in the semiconductor process utilized for fabrication or in post processing. The light-passing area 602 may also receive other special processing to optimize light detection, for example an anti-reflective coating, filter, and/or diffuser. The light-blocking region 604 may cover other circuitry on the die which does not require light exposure. The performance of the other circuitry may be degraded by photocurrents, for example, shifting bias voltages and oscillator frequencies in the ultra-low current circuits required for incorporation into contact lenses, as mentioned previously. The light-blocking region 604 is preferentially formed with a thin, opaque material, for example, aluminum, copper, or titanium already use in semiconductor wafer processing and post processing. If implemented with electrically conductive metal, the material forming the light-blocking region 604 must be insulated from the circuits underneath and the bond pads 606 to prevent short-circuit conditions. Such insulation may be provided by the passivation already present on the die as part of normal wafer passivation, e.g. oxide, nitride, and/or polyimide, or with other dielectric added during post-processing. Masking permits light blocking layer openings 610 so that conductive light-blocking metal does not overlap bond pads on the die. The light-blocking region 604 is covered with additional dielectric or passivation to protect the die and avoid short-circuits during die attachment. This final passivation has passivation openings 608 to permit connection to the bond pads 606.

Figure 7:
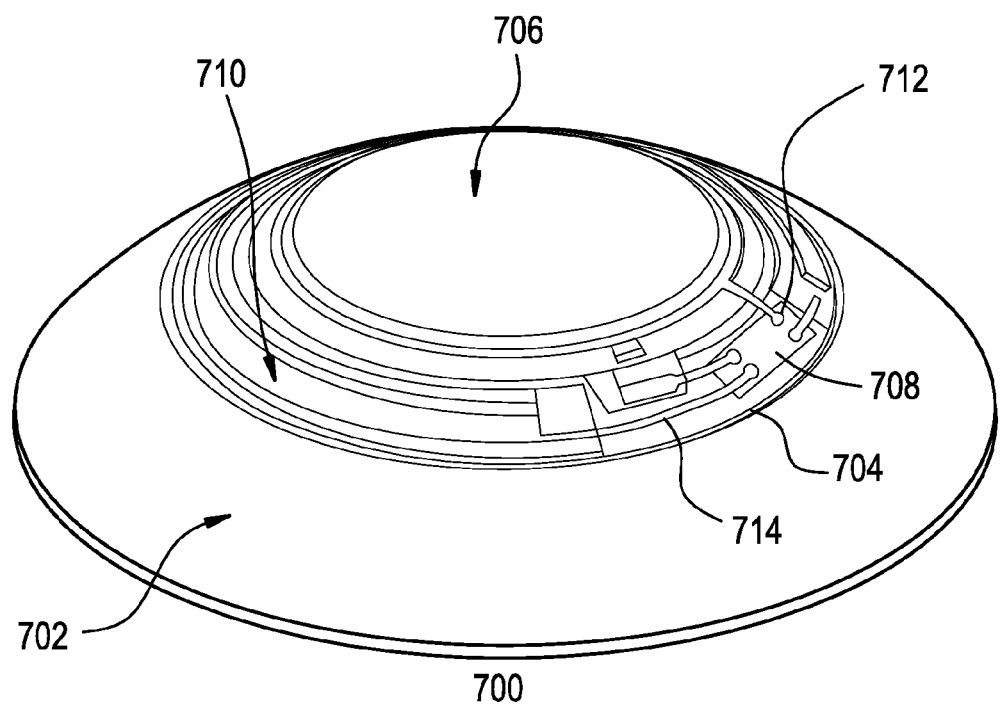
FIG. 7 is a diagrammatic representation of an exemplary electronic insert, including a photodetector system, positioned in a powered or electronic contact lens in accordance with the present invention.

FIG. 7 illustrates an exemplary contact lens with an electronic insert comprising a blink detection system in accordance with the present invention. The contact lens 700 comprises a soft plastic portion 702 which comprises an electronic insert 704. This insert 704 includes a lens 706 which is activated by the electronics, for example, focusing near or far depending on activation. Integrated circuit 708 mounts onto the insert 704 and connects to batteries 710, lens 706, and other components as necessary for the system. The integrated circuit 708 includes a photodiode array 712 and associated photodetector signal path circuits. The photodiode array 712 faces outward through the lens insert and away from the eye, and is thus able to receive ambient light. The photodiode array 712 may be implemented on the integrated circuit 708 (as shown) for example as a single photodiode or array of photodiodes. The photodiode array 712 may also be implemented as a separate device mounted on the insert 704 and connected with wiring traces 714. When the eyelid closes, the lens insert 704 including photodetector 712 is covered, thereby reducing the light level incident on the photodetector 712. The photodetector 712 is able to measure the ambient light and/or infrared light.

Additional considerations of the photodetector system of the present invention allow for further reduction in the required area, volume or cost of the photodetector system and powered or electronic ophthalmic lenses into which the system may be incorporated.

The integration capacitances $C_{int}$ may be formed partly by an input capacitance of the analog-to-digital converter, such as a feedback DAC capacitor array in a successive approximation analog-to-digital converter (SAR ADC). Note that this would apply in the case of the exemplary embodiments described with FIG. 5 if the integration periods for the two photodiode arrays are not simultaneous.

In the photodetector system of FIG. 5, a single analog-to-digital converter is used for conversion of two quantities. An alternative embodiment may employ two analog-to-digital converters, but using one provides for cancellation of any offset inherent in the analog-to-digital converter itself whereas a system with two analog-to-digital converters would have a residual offset corresponding to the mismatch in offsets between the converters.

Preferably the photodiode arrays are implemented in a CMOS technology to increase integration ability and reduce the overall size of the photodetector system and the signal processing and system controller circuitry. Preferably the photodetector system, the signal processing circuitry and the system controller circuitry are integrated together in a single silicon die, reducing area required in the powered or electronic ophthalmic lens for interconnection traces and on the die for bonding or bumping pads.

It will be appreciated by those skilled in the art that the photodiode array may comprise fewer photodiodes when lower dynamic range is required. For example, in some embodiments a photodiode array comprising a single photodiode may be sufficient. The photodiodes may comprise a single photodiode element. However the best gain scaling may be achieved by implementing the larger photodiodes with a number of interconnected (e.g. in parallel) photodiode elements of a common design (dimensions, area, diffusion types).

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:
1. A powered ophthalmic device comprising:
a first sensor including one or more photodiodes producing a first output current;
a first integrator receiving the first output current and converting it to a first output voltage, wherein the first integrator comprises a first switch and a first capacitor, and is configured to integrate the first output current over a predetermined integration period of time;
an analog-to-digital converter configured to receive the first output voltage and to provide a digital output signal based on the first output voltage;
a second sensor containing one or more photodiodes producing a second output current;
a second integrator receiving the second output current and converting it to a second output voltage, wherein the second integrator comprises a third switch and a second capacitor, and is configured to integrate the second output current over the predetermined integration period of time;
a light-blocking element configured to block substantially all incident light from reaching the second sensor;
a first output voltage switch configured to selectively couple the first output voltage to the analog-to-digital converter;
a first digital register configured to selectively receive a digital output of the analog-to-digital converter or to hold a stored value, the stored value being based on the digital output of the analog-to-digital converter at an earlier time;

a second output voltage switch configured to selectively couple the second output voltage to the analog-to-digital converter; and a digital subtractor coupled to the first digital register and to the analog-to-digital converter.

2. The powered ophthalmic device according to claim 1, wherein a component of the first output current from the photodiodes of the first sensor is proportional to incident light.

3. The powered ophthalmic device according to claim 1, wherein the predetermined integration period of time is a function of a period of an undesired signal.

4. The powered ophthalmic device according to claim 1 further comprising a reference voltage source, and wherein the first switch is configured to selectively couple the first capacitor to the voltage reference source.

5. The powered ophthalmic device according to claim 1, wherein the first sensor is further configured to firstly close the first switch to precharge the first capacitor for a precharge time interval and then to secondly open the first switch for a predetermined integration period of time.

6. The powered ophthalmic device according to claim 1, wherein the one or more photodiodes of the first sensor are selectively coupled to the first capacitor such that the gain and/or sensitivity of the first sensor can be varied.

7. The powered ophthalmic device according to claim 6, wherein the selective coupling of the one or more photodiodes of the first sensor is based on a function of the output voltage.

8. The powered ophthalmic device according to claim 1, wherein the first integrator further comprises a second switch configured to selectively couple the capacitor to the one or more photodiodes of the first sensor such that the output voltage of the integrator is held for a predetermined hold period of time.

* * * * *